United States Patent
Power

(10) Patent No.: US 7,688,213 B2
(45) Date of Patent: Mar. 30, 2010

(54) SLEEP ALERT DEVICE

(76) Inventor: Jerome Arnold Power, 233 Saddletree Rd., Oxford, NC (US) 27565

( * ) Notice: Subject to any disclaimer, the term of this patent is extended or adjusted under 35 U.S.C. 154(b) by 354 days.

(21) Appl. No.: 11/391,652

(22) Filed: Mar. 28, 2006

(65) Prior Publication Data

US 2006/0250256 A1 Nov. 9, 2006

Related U.S. Application Data

(60) Provisional application No. 60/678,881, filed on May 6, 2005.

(51) Int. Cl.
*G08B 23/00* (2006.01)
(52) U.S. Cl. .................................................. 340/575
(58) Field of Classification Search ................ 340/575, 340/576; 180/271, 272; 73/379.02
See application file for complete search history.

(56) References Cited

U.S. PATENT DOCUMENTS

| | | | | |
|---|---|---|---|---|
| 4,210,905 A | | 7/1980 | Coons | 340/575 |
| 4,361,834 A | * | 11/1982 | King | 340/575 |
| 4,488,726 A | * | 12/1984 | Murray | 473/202 |
| 5,585,785 A | | 12/1996 | Gwin et al. | 340/575 |
| 5,681,993 A | * | 10/1997 | Heitman | 73/379.02 |
| 5,969,616 A | | 10/1999 | Tschoi | 340/576 |
| 6,016,103 A | * | 1/2000 | Leavitt | 340/575 |
| 6,067,020 A | | 5/2000 | Wimmer | 340/575 |
| 6,107,922 A | | 8/2000 | Bryuzgin | 340/576 |
| 6,172,610 B1 | | 1/2001 | Prus | 340/575 |
| 6,218,947 B1 | * | 4/2001 | Sutherland | 340/576 |
| 6,559,770 B1 | | 5/2003 | Zoerb | 340/575 |
| 6,590,499 B1 | * | 7/2003 | D'Agosto | 340/575 |
| 6,791,462 B2 | | 9/2004 | Choi | 340/575 |
| 6,946,965 B2 | | 9/2005 | Young et al. | 340/575 |
| 2004/0051642 A1 | | 3/2004 | Choi | |
| 2004/0124985 A1 | | 7/2004 | Young et al. | |

OTHER PUBLICATIONS

VOLVO, World breakthrough from Volvo Cars alerts tired and unconcentrated drivers, Nov. 30, 2005, 3 pages.
Bolton Meg, Friends don't let friends drive drowsy, Findings at Baylor College of Medicine, Apr. 2005, 3 pgs, vol. 03, Issue 4, Baylor College of Medicine, Houston, Texas.

* cited by examiner

*Primary Examiner*—Phung Nguyen
(74) *Attorney, Agent, or Firm*—Jim Passé; Passé Intellectual Property, LLC

(57) ABSTRACT

The present invention relates to a sleep alert device that acts by pressure on the fingers of the user. The invention includes a limited number of sensors as well as an instant alarm system which prevents accidental problems with previous delay alarm systems. One to three sensors are mounted on the fingers of the user and with no delay of any kind connected directly or wirelessly to a control panel for control of the pressure sensors.

3 Claims, 4 Drawing Sheets

SLEEP ALERT DEVICE

CROSS-REFERENCE TO RELATED APPLICATIONS

This application claims the benefit of and priority to U.S. Provisional Application No. 60/678,881, filed May 6, 2005 and is hereby incorporated in its entirety by reference herein.

BACKGROUND OF THE INVENTION

1. Field of the Invention

The present invention relates to sleep detection warning devices and more particularly it pertains to a novel sleep alert warning system for waking a dozing driver.

2. Description of the Prior Art

Drivers of motor vehicles, especially truck drivers, often put in long grueling hours at the wheel of their vehicle. Because of the need or desire to reach a given destination at a given time it is not infrequent that drivers spend more time at the wheel than is reasonably prudent and safe or spend time driving fatigued long past when they should be asleep. It is not surprising then that motor vehicle accidents occur where the driver has dozed off at the wheel and where the vehicle has veered off the road. Accidents result not only in vehicle damage, property damage and severe injury or death of the driver, it can also result in the death or injury of other drivers or pedestrians in the area of the accident. According to the National Highway Traffic Safety Administration, there are about 100,000 police-reported crashes that are the direct result of driver fatigue each year. Accidents that occur when the driver falls asleep at the wheel often have a high percentage of fatality. NHTSA conservatively estimates fatigue-related crashes results in an estimated 1,550 deaths, 71,000 injuries and $12.5 billion in monetary losses each year. In Europe too the situation is very similar. The German Insurance Association—GDV (Gesamtverband der Deutschen Versicherungswirtschaft e.V.)—estimates that about 25 percent of all fatal accidents on German motorways are caused by tiredness.

A number of systems have been developed to attempt to alert the driver who is falling asleep. Volvo is introducing a complex system of cameras, sensors, processors and computer controls for their consumer based automobiles to alert when a driver has become fatigued by measuring the movement of the car. It apparently only works when the vehicle is traveling 60 KPH or more. The device works independent of the driver and depends on complex calculations without actually knowing the condition of the driver.

Eye and head movements have been associated with fatigue and some solutions have revolved around devices that utilize this information. In U.S. Pat. No. 6,107,922 to Bryuzgin issued Aug. 22, 2000 a self contained headset is described. The device monitors the position of a driver's lower jaw as an indicator of the driver's condition. The device is triggered when the drivers jaw moves downward triggering an alarm condition. The device relies on motion that could also occur during talking or head movement and isn't necessarily the first motion indicator of a tired driver. In U.S. Pat. No. 6,559,779 to Zoerb, a safety apparatus utilizing an eyeglass mounted light beam emitter and detector which will sound an alarm when a drowsy driver's eye closes and his eyelashes interrupt a focused light beam is described. The device requires accurate alignment and calibration and is affected by both exterior light sources and well as head movements and blink pattern.

It is known that as a driver fatigues, his grip on the steering wheel relaxes. Measurement of grip has been measured by devises which mount on the steering wheel and those that mount on the hand. In U.S. Pat. No. 6,218,947 to Sutherland issued Apr. 17, 2001 describes a sleep alarm mounted on the steering wheel comprising a pair of conductive elements that measure conductive capacitance between the two hands on the steering wheel. The difference is used to establish a baseline which when changed initiates an alarm.

In U.S. Pat. No. 6,016,103 to Leavitt issued Jan. 18, 2000 there are at least one pressure sensor on each of two gloves. The sensors can be positioned on any of the fingers (shown on the finger tips) or the palm of the hand. There is a remote communication means between the two gloves and an alarm is activated when grip pressure of both hands falls below a threshold level. The device requires the drivers grip to be relaxed on both hands to be triggered and the device has a preferred embodiment where grip pressure has to fall below a threshold for a given period of time. In U.S. Pat. No. 6,172,610 to Prus issued Jan. 9, 2001, there is described a contact means where there is a sensor mounted on a glove and a contact mounted on the steering wheel. As long as the glove and wheel sensors are in contact the alarm does not sound. Contact is measured by the drivers' skin resistance rather than pressure and has been considered unreliable since the ambient temperature differences effect perspiration and thus alter skin resistance readings. In U.S. Pat. No. 6,590,499 to D'Agosto, describes a steering wheel mounted alert system. It requires either a custom manufactured steering wheel or custom installation and requires the steering wheel to be firmly griped to be activated.

While it is clear that each of these devices fulfill a particular objective or requirement it is clear that each has particular limitations and in general are either extraordinarily complex or do not activate an alarm until the driver has already started to dose off. It would be useful if there was a sensor arrangement which sounded an alarm instantly when the driver starts to doze and not when he is asleep. It would be useful if the system were simple and operated with a minimum of complicated interactions.

SUMMARY OF THE INVENTION

It is an object of the present invention to provide a novel device that has addressed the above problems along with other benefits to the user which will become evident from the disclosure and examples described herein. The present invention is relatively simple to use, activates immediately if a driver starts to nod off, can easily be turned off for repositioning or other activity and is cost effective compared to other systems. Accordingly, the invention provides in a broad embodiment a sleep alert device for use while driving a vehicle comprising:

between one and three pressure sensors mounted on a means for attaching the sensors to the fingers of one hand;

an alarm which is activated immediately when the grip pressure on any one sensor falls below a predetermined value;

a means for turning the sensors on or off; and a pause means for temporarily deactivating the sensors while the device is in use.

It is another object of this invention to provide a sleep alarm that is positioned at the most effective part of the hand for pressure sensitivity by placement on the figures in a desirable location that is more likely to be a true measure of pressure. It is yet a further object of the invention to take automation out of the process of putting a sleep detector on hold or during other activities which eliminate errors or dependence on the automated part of the system to be accurate.

DETAILED DESCRIPTION OF THE INVENTION

Figure 1:
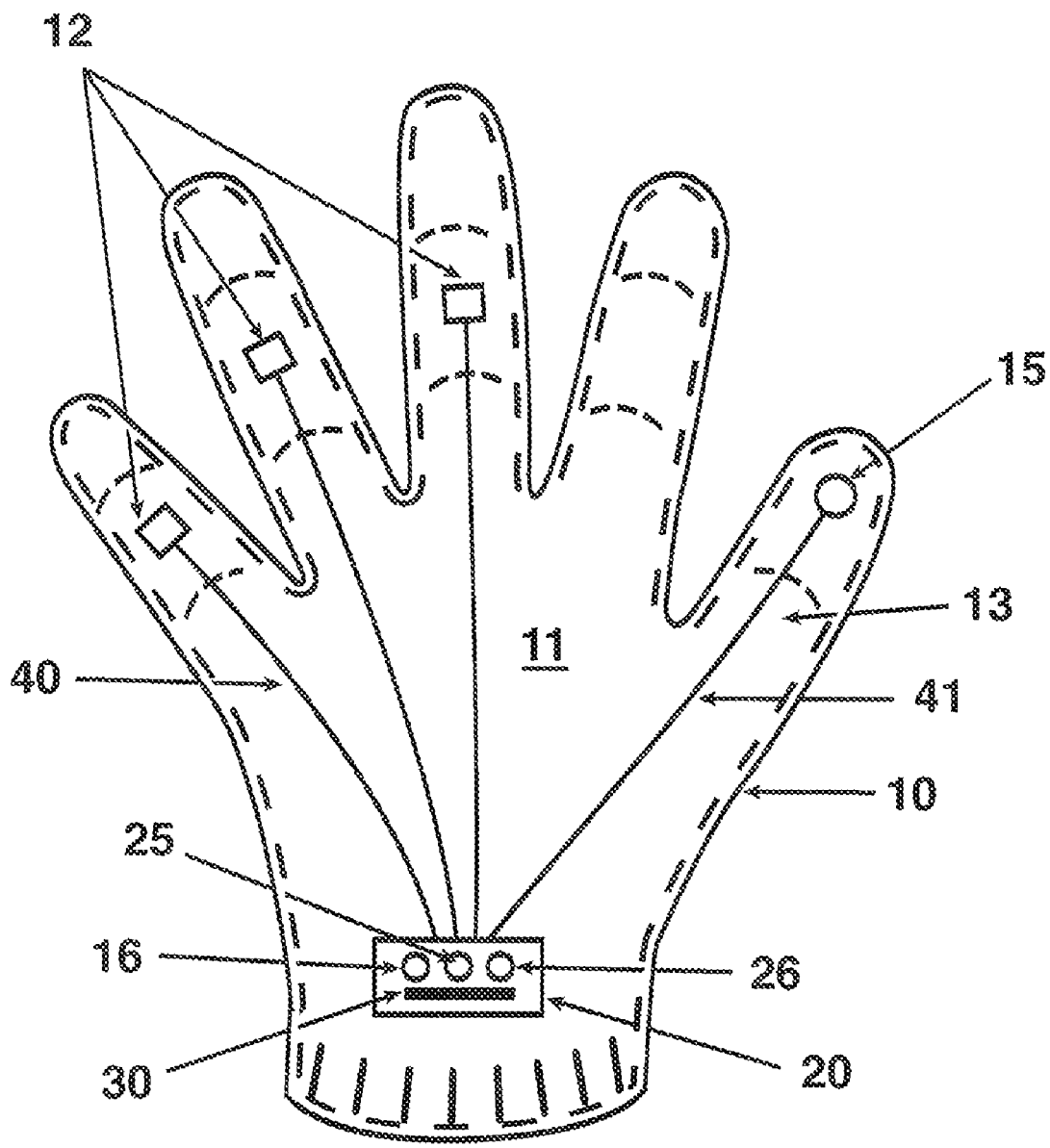
FIG. 1 shows a perspective of the invention attached to a glove with sensors on the palmar aspect.

The present invention consists of between one and three pressure sensors mounted on a finger or fingers of a drivers hand. These sensors are connected to a microprocessor for determining pressure of the fingers on the steering wheel while driving. It is powered by a battery or the like and controlled by an on off switch and a pause means. An alarm which can sound upon reaching a minimum pressure value is connected to the processor and in one embodiment the threshold level is adjustable.

As used herein "sleep alert device" refers to a device designed to alert the user when they are falling asleep in order to prevent the user from falling asleep. This is most useful while driving a car or truck where if the driver even begins to nod off, the sleep alert device can sound an alarm and prevent the driver from falling asleep.

As used herein 'pressure sensors" refers to electronic pressure sensor pads known in the art which can be used to measure the pressure between the steering wheel and the user's fingers when the pressure sensor is mounted. In one embodiment there are between one and three sensors and in yet another embodiment just one sensor. Pressure sensors are normally connected to a microprocessor or the like and this can be done as in the figures which follow by a direct wire connection but with today's miniaturization of components could be done by RF, Bluetooth or other wireless means. The pressure sensor could be a simple on off switch mechanism or could be, in one embodiment, a timer which turns the unit on or off after a given period of driving. The pressure sensor could be connected directly to the alarm via wired or wireless means. The ideal mounting position for the pressure sensors is on the fingers and in one embodiment on the middle, ring and/or little finger. In one embodiment the sensor is placed on the part of the finger which most likely comes in contact with the steering wheel which would be on the palm side of the finger between the distal interphalangeal joint and the metacarpo-phalangeal joint of the finger.

As used herein a "means for attaching to the fingers of one hand" refers to the fact that in the invention all the sensors will be on a single hand leaving one hand free to pause the device, operate other devices and in general be free to do what ever the driver wishes. In one embodiment the means can be a glove where the sensor is attached to the glove on the palm side such that the sensor comes in contact with the steering when while the glove is worn during driving. Since in one embodiment the thumb and index finger do not have sensors mounted or where there are less than 3 sensors, there could be a glove with only the number of fingers in the glove corresponding to the number of sensors, e.g. 3 fingers where there are three sensors.

There are several controls which can be mounted on the hand directly, on a glove or other hand worn covering or strap or can be attached to the steering wheel, dash or other portion of the car, for example, by wireless mean. They can be mounted together or any of the controls can be separated from the rest and mounted as desired.

As used herein "alarm" refers to a means for shaking a dozing driver from his about to be sleeping state. This could be an audio alarm, a vibratory means, or the like which would startle the driver just enough to bring him back from the brink of sleep. In one embodiment this may be a buzzer or other audio device. The alarm would be connect to the microprocessor or the pressure sensor directly and be triggered when the pressure applied to the sensor drops below a given threshold level. In one embodiment there could be an adjustment means for adjusting the level at which the alarm is triggered. It is an embodiment of this invention that there not be a delay in activation of the alarm built into the mechanism, as for example as taught in U.S. Pat. No. 6,016,103. A delay would mean that the driver could have already driven off the road, crashed and been killed before the alarm would be triggered.

As used herein "pause means" refers to a switch or other means for deactivating the device while in use for repositioning the hands or the like. It can consist of an on off switch in fact be the power switch but in one embodiment it a separate switch which allows the device to remain powered while momentarily deactivating the ability of the alarm to sound. The switch can be a momentary or spring loaded switch, can be a gravity activated switch or the like.

Straps as used herein refers to those means such as Velcro brand hook and loop fasteners which can be used in lieu of a glove for mounting the sensors on the hand. Under some conditions gloves can be excessively warm, and interfere with the driving capabilities of the driver. In some instances the high humidity created by a glove would cause a medical problem for some uses. In those embodiments a strap can be used in place of the glove.

As mentioned above wireless connections are contemplated within the scope of several embodiments of the invention. Such wireless means are now well know in the art as described above and one skilled in the art would be able to adapt the invention for such use.

Timers within the scope of the invention are well known and would consist of an electronic clock timer which could be programmed to turn the device on or off at a predetermined time or perhaps used as an alarm clock to remind the driver for a particular activity or to automatically give the driver an opportunity to reposition the sensor hand without pressing the pause button. This last embodiment would be an automatic pause timer.

It is known within the art that each driver has his or her own driver grip pressure. In one embodiment then the grip pressure can be adjusted on the device by addition of a means of variably adjusting resistance or other standard means for setting pressure on a sensing device.

In an embodiment shown in the drawing, FIG. 1 is a perspective of the invention 10 attached to a glove 11 with sensors on the palmar aspect. The driver places glove 11 on his hand. On/off button 16 as shown activates the device. Addition switch 15 depicted on the thumb 13 of glove 11 can be a pause means the on off switch or both. Control panel 20 for mounting controls is shown in this embodiment on the palm (palmar) side of the glove 11. The Control panel 20 can be mounted in any convenient location and in a different embodiment not shown in FIG. 1, it is mounted on the back side of the glove 11. Also on control panel 20 is pressure control switch 25 for controlling the amount of pressure which activates the invention. Lastly show is adjustable volume switch 26 for adjusting the volume of the alarm 30. Alarm 30 in this embodiment is shown as a hashed area, indicating that alarm has a speaker means for some kind to sound. A battery can be inserted if necessary into the control panel 20 or anywhere according to the art. Lastly, connecting wires 40 and 40 represent the electrical connection between the sensors 12 and pause button 15 respectively.

Figure 2:
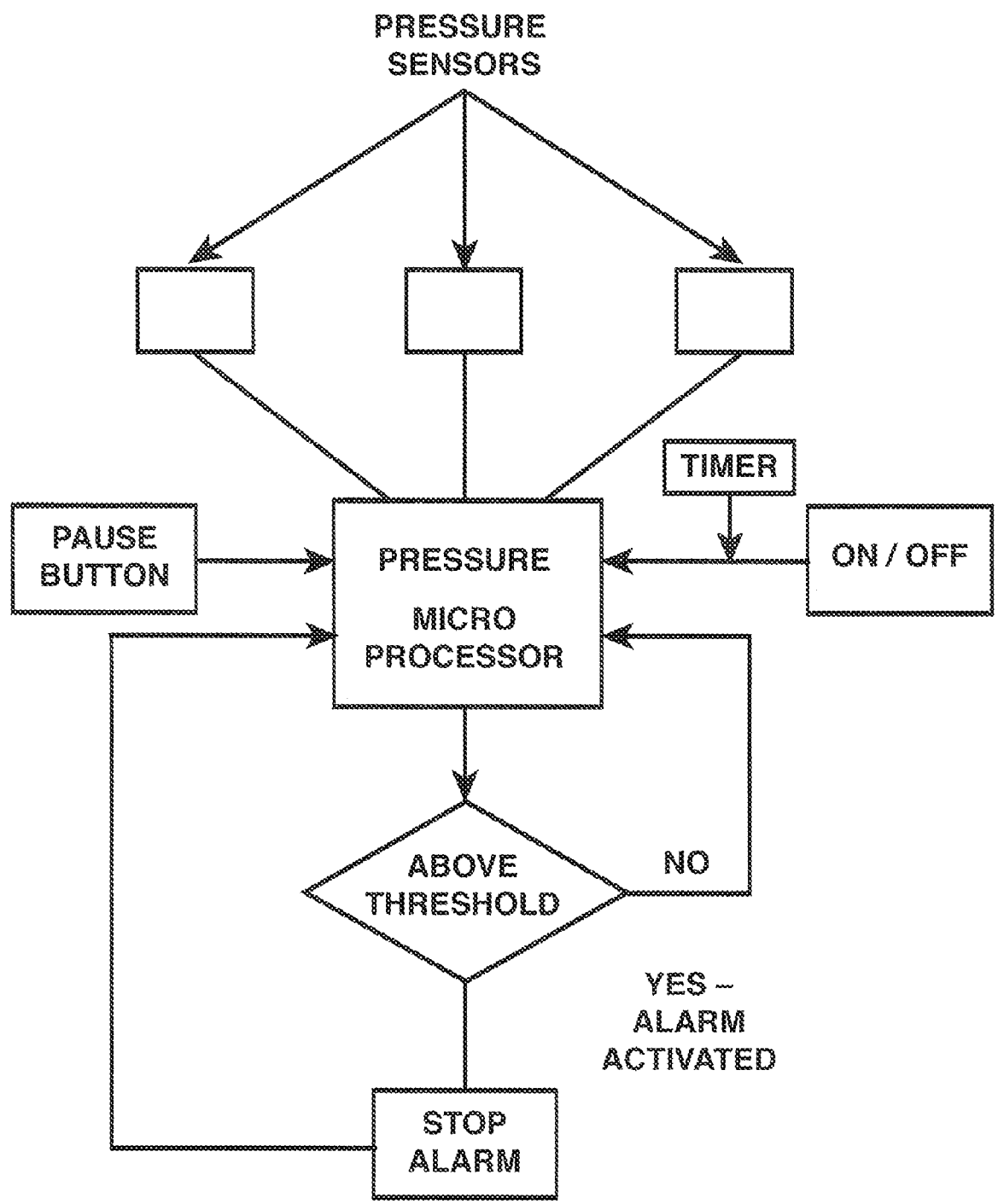
FIG. 2 is a flow chart showing the operation of the circuit of the invention.

FIG. 2 represents a flow diagram of the workings of the present invention. The flow diagram indicates the instantaneous nature of the sensor of the invention as well as the ultimate simplicity.

Figure 3:
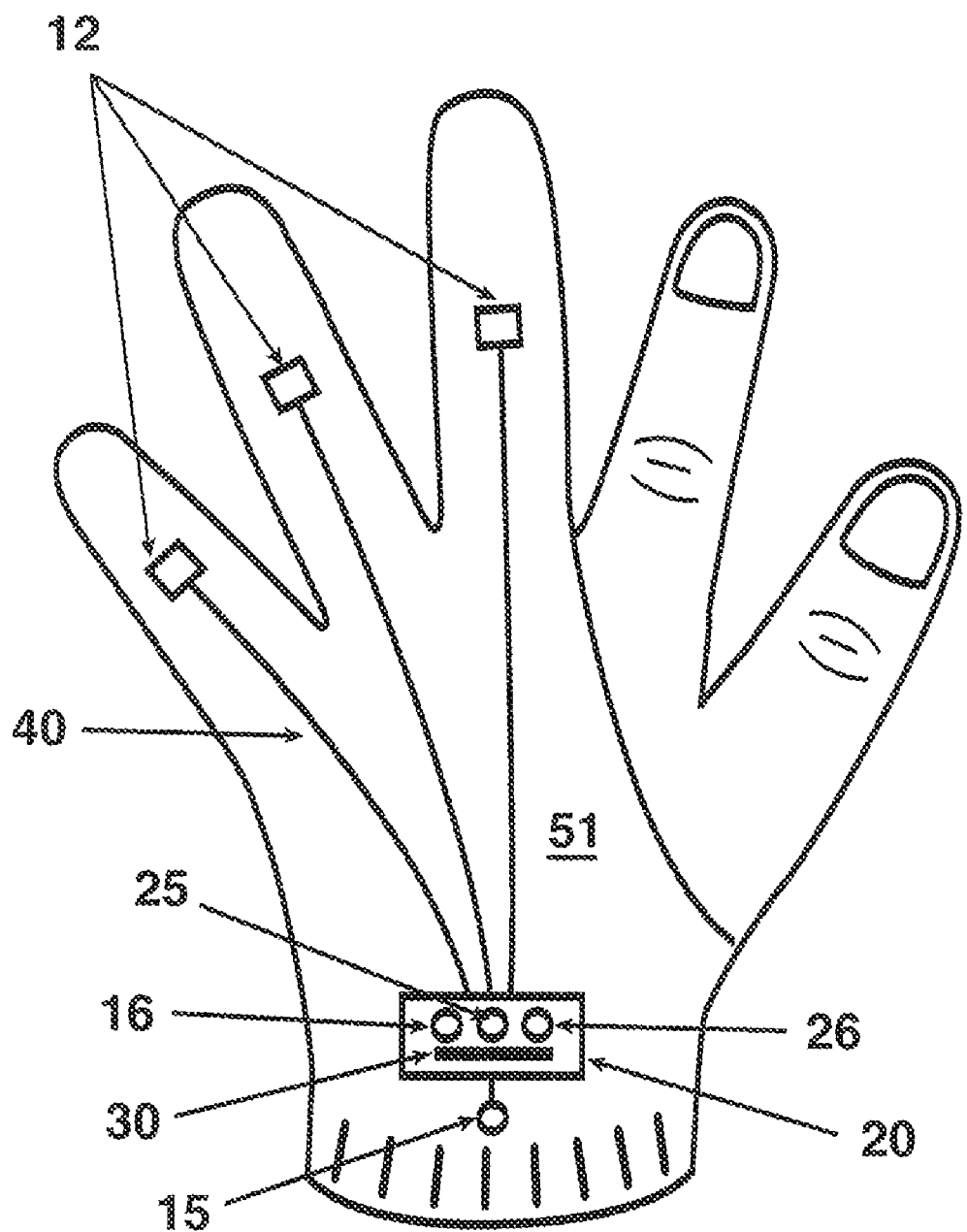
FIG. 3 is a perspective aspect of the invention wherein a glove only has fingers where a corresponding sensor is mounted.

FIG. 3 represents yet another embodiment of the invention wherein in a back of hand aspect, a three fingered glove 51 is shown. In this embodiment, glove 51 only has fingers corresponding to sensors 12. While this changes the positioning pause button 15 from the 5 finger embodiment in FIG. 1, it allows for freedom of movement of the thumb and forefinger of the ultimate user. As in FIG. 1, the connecting wires 40 are shown connecting to control panel 20. Also shown are on/off button 16 as well as pressure control switch 25 and alarm volume control 26. Pause button 15 in this embodiment is positioned near the control panel 20.

Figure 4:
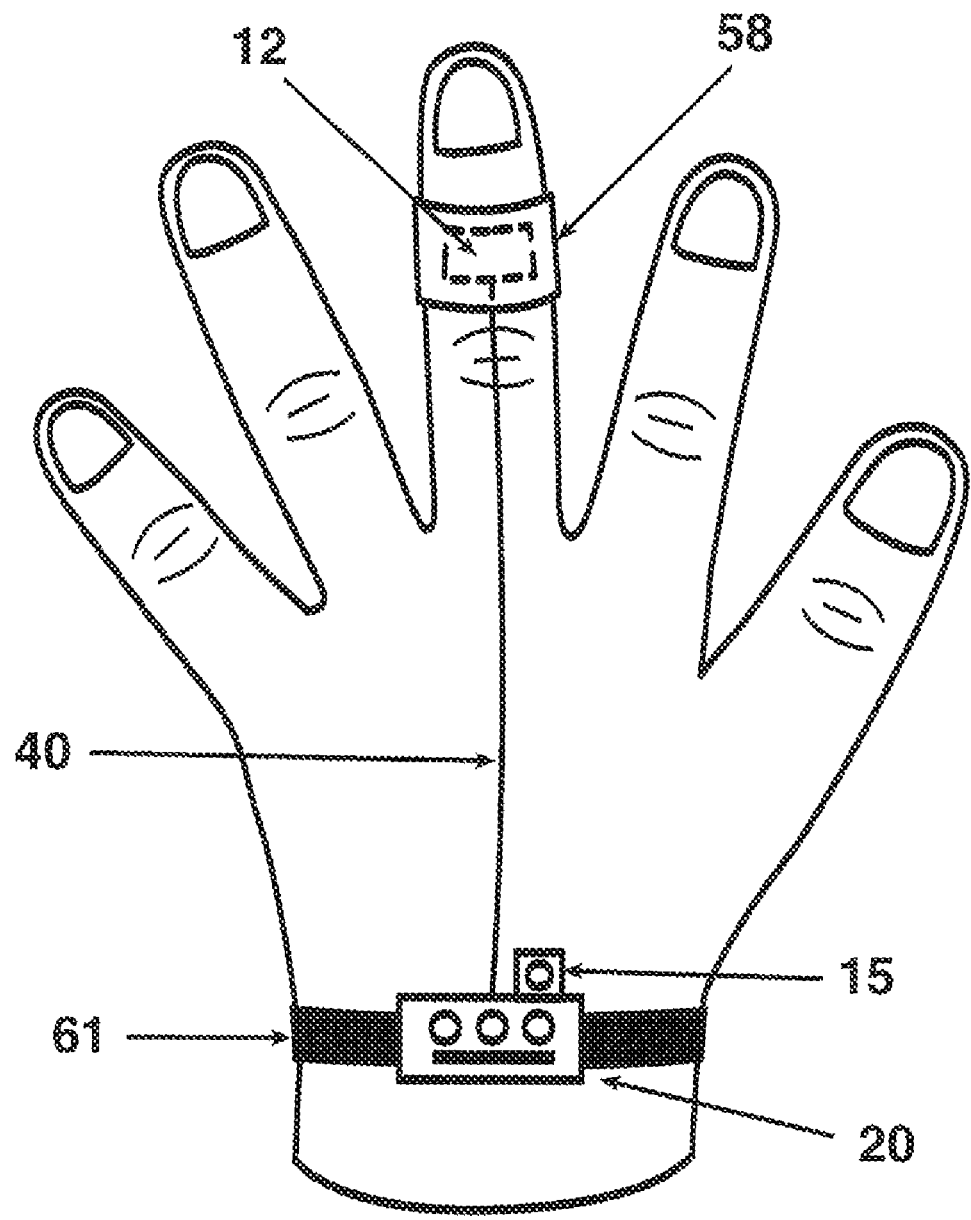
FIG. 4 is a perspective of the invention mounted to a single finger and without a glove.

FIG. 4 is yet another embodiment of the invention. This embodiment is where the sensor 12 is mounted via use finger strap 58. In this view the sensor 12 is on the palm side of the hand. The control panel 20 is attached to the users hand via wrist strap 61. In other embodiments the control panel 20 could be miniaturized and placed on the finger strap. In this embodiment pause button 15 is mounted on the control panel. On/off Switch 16, pressure control switch 25 and alarm volume control 26 are as previously described.

It is understood that wired connection 40 could also represent a wireless connection within the skill in the art. Accordingly, the pause mechanism connection 41 could also be wireless.

Accordingly, a novel approach to producing a driver sleep alert device is now disclosed which over comes many of the problems and faults of previous devices. One skilled in the art will be able to produce variations and other embodiments within the scope of the invention in view of the above disclosure. The disclosure is thus not intended to be limiting or all inclusive and the broadest possible interpretation is intended in the claims which follow.

What is claimed is:

1. A sleep alert device for use while driving a vehicle comprising:
   a) between one and three pressure sensors mounted on a means for attaching the sensors to the fingers of one hand;
   b) an alarm which is activated immediately when the grip pressure on any one sensor falls below a predetermined value;
   c) a means for turning the sensors on or off which is controlled by a timer; and
   d) a pause means for temporarily deactivating the sensors while the device is in use.

2. A sleep alert device for use while driving a vehicle comprising:
   a) between one and three pressure sensors mounted on a means for attaching the sensors to the fingers of one hand;
   b) an alarm which is activated immediately when the grip pressure on any one sensor falls below a predetermined value;
   c) a means for turning the sensors on or off;
   d) a pause means for temporarily deactivating the sensors while the device is in use; and
   e) an automated means for turning the device on at a preselected interval of time.

3. A sleep alert device for use while driving a vehicle consisting of:
   a) one pressure sensor mounted on a means for attaching the sensor to one or more fingers of one hand;
   b) an alarm which is activated immediately when the grip pressure on the sensor falls below a predetermined value; and
   c) a means for turning the sensor on or off wherein the means for turning the sensor on or off is connected wirelessly to the pressure sensor.

* * * * *